United States Patent
Kakkirala et al.

(10) Patent No.: US 9,269,362 B2
(45) Date of Patent: Feb. 23, 2016

(54) METHOD AND SYSTEM FOR BLIND AUDIO WATERMARKING

(75) Inventors: Krishna Rao Kakkirala, West Godavari (IN); Srinivasa Rao Chalamala, Hyderabad (IN)

(73) Assignee: Tata Consultancy Services Ltd. (IN)

(*) Notice: Subject to any disclaimer, the term of this patent is extended or adjusted under 35 U.S.C. 154(b) by 724 days.

(21) Appl. No.: 13/609,149

(22) Filed: Sep. 10, 2012

(65) Prior Publication Data

US 2014/0005815 A1 Jan. 2, 2014

(30) Foreign Application Priority Data

Jun. 27, 2012 (IN) .......................... 1866/MUM/2012

(51) Int. Cl.
*G06F 17/00* (2006.01)
*G10L 19/018* (2013.01)
*G06F 17/14* (2006.01)

(52) U.S. Cl.
CPC ............. *G10L 19/018* (2013.01); *G06F 17/148* (2013.01)

(58) Field of Classification Search
None
See application file for complete search history.

(56) References Cited

U.S. PATENT DOCUMENTS

| 6,934,403 | B2 | 8/2005 | Joo | |
|---|---|---|---|---|
| 2003/0120927 | A1 | 6/2003 | Kim | |
| 2003/0172275 | A1 | 9/2003 | Lee | |
| 2004/0264732 | A1* | 12/2004 | Tian | .............................. 382/100 |
| 2010/0061585 | A1 | 3/2010 | Guo | |

FOREIGN PATENT DOCUMENTS

| CN | 1540600 A | 10/2004 |
|---|---|---|
| CN | 102063696 A | 5/2011 |

OTHER PUBLICATIONS

Wenhai Kong, et al.; "SVD Based Blind Video Watermarking Algorithm"; Proceedings of the First International Conference on Innovative Computing, Information and Control (ICICIC), 2006, pp. 265-268.*
Chan et al.; A Novel Scheme for Hybrid Digital Video Watermarking: Approach, Evaluation and Experimentation; IEEE Transactions on Circuits and Systems for Video Technology, vol. 15, No. 12, Dec. 2005; pp. 1638-1649.*
Ali Al-Haj, et al.; "Hybrid DWT-SVD Audio Watermarking"; International Conference on Digital Information Management—ICDIM, 2010, pp. 525-529.*
Lama Rajab et al., "Video Watermarking Algorithms Using the SVD Transform," European Journal of Scientific Research, vol. 30 No. 3 (2009), pp. 389-401, EuroJournals Publishing, Inc., available at: http://www.eurojournals.com/ejsr.htm.

(Continued)

*Primary Examiner* — Fan Tsang
*Assistant Examiner* — David Siegel
(74) *Attorney, Agent, or Firm* — Robert Plotkin, P.C.; Robert Plotkin

(57) ABSTRACT

A method and system for blind audio watermarking has been envisaged. The system embeds an in-audible watermark by modifying a predetermined singular value in the wavelet domain. The generated watermarked audio signals are robust again Gaussian noise and other watermark removal and compression attacks. Also, the system can perform watermark extraction/detection in real-time without requiring in advance, either the original audio signal or its processed parameters. Thereby, the method and system provide a real-time, efficient technique for blind audio watermarking.

10 Claims, 3 Drawing Sheets

(56) References Cited

OTHER PUBLICATIONS

Ali Ai-Haj, et al.; "Hybrid DWT-SVD Audio Watermarking"; International Conference on Digital Information Management—ICDIM, 2010, pp. 525-529.

Ke Niu, et al.; "Hybrid Quasi-3D DWT/DCT and SVD Video Watermarking"; IEEE International Conference on Software Engineering and Service Sciences (ICSESS), 2010, pp. 588-591.

* cited by examiner

METHOD AND SYSTEM FOR BLIND AUDIO WATERMARKING

CROSS-REFERENCE TO RELATED APPLICATIONS

This application claims priority from Indian Patent Application Number 1866/MUM/2012, filed on Jun. 27, 2012, entitled, "A Method and System for Blind Audio Watermarking."

FIELD OF DISCLOSURE

The present disclosure relates to a method and a system for providing effective blind audio watermarking for copyright protection of digital content.

DEFINITIONS OF TERMS USED IN THE SPECIFICATION

The term 'attack' in this specification relates to any malicious manipulation performed on an object electronic content, which aims at tampering or removing an embedded watermark.

The term 'content' in this specification relates to media including audio or speech.

The term 'watermark' in this specification relates to a unique pattern, logo or bar code that is inaudibly added to content. This unique pattern or logo is used to find the owner of the content as each owner of the electronic content is associated with a unique watermark.

The term 'Discrete Wavelet Transform (DWT)' relates to a signal processing technique, which transforms a signal from time to a joint time-frequency domain. The joint time-frequency domain enables extraction of simultaneous time and frequency information in the form of coefficients present in a signal, that is, information about which frequencies are present at what time can be extracted using DWT. In this disclosure, DWT is used for successive decomposition of the signal into low frequency (approximated) and high frequency (detailed) components/coefficients.

The term 'Singular Value Decomposition (SVD)' in the specification relates to a technique which factorizes an input matrix into three sub matrices. SVD is characterized by $A=U*D*V^T$, where, A is the input matrix;
U matrix has the right singular vectors in column wise;
$V^T$ matrix has the left singular vectors as its row wise; and
D is a diagonal matrix and has the singular values as its diagonal wise and in the descending order.

BACKGROUND

Digital watermarking involves a process of modifying physical or electronic content to embed a machine-readable code, customer information or logo images into object content, particularly for information security and data access authentication purposes. The content may be modified such that the embedded code is imperceptible or inaudible to the user, yet may be detected or extracted through a detection or extraction process. Most commonly, digital watermarking is applied to media signals including images, audio signals, and video signals. However, it may also be applied to other types of media objects, including documents (for instance, through line, word or character shifting), software, multi-dimensional graphics models, and surface textures of objects.

Digital watermarking systems typically have two primary components: an encoder that embeds the watermark in a host content signal, and a decoder that detects or extracts and reads the embedded watermark from a signal suspected of containing a watermark (a suspect signal). The encoder embeds a watermark by altering the host content signal. Typically, random sequences or customer logo images are used as keys to watermark media signals to be used as a watermark during the embedding process.

The decoder analyzes a suspect signal to detect whether a watermark is present to extract a watermark. The watermark can only be detected in the suspect signal by comparing exactness or near exactness of the embedded watermark. The pirates of content may try to eliminate the watermark from the media content by manipulating media signals including audio, video, image, computer readable medium, Compact Disc (CD), hard disk, Floppy drive, and any kind of document and the like.

Hence, a need for a watermark detection technique is felt particularly for commercially distributed content including audio, video and gaming to ascertain type, strength and coverage of manipulation and location of the attack in the content.

Also, there exists a need to have a robust method and system for embedding and detecting or extracting the watermark in the electronic content for each of the possible attacks and combinations thereof, wherein the electronic media goes through various kinds of intentional distortions, unintentional distortions, signal processing and cryptographic attacks and other combinations of the attacks which are unknown while detecting the watermarks.

Moreover, the present-day watermark detection techniques either require the original content file or some of its processed parameters to detect the watermark embedded in the digital content. Therefore, there is also felt a need for a watermarking technique which can perform watermark detection without requiring the original content file or its processed parameters.

OBJECTS

Some of the objects of the present disclosure, which at least one embodiment herein satisfies, are as follows:

It is an object of the present disclosure to provide a robust method and system for audio watermarking.

It is another object of the present disclosure to provide a method and system which ascertains type, strength and coverage of manipulation and location of an attack in a watermarked audio signal.

It is still another object of the present disclosure to provide a method and system which embeds and detects/extracts watermarks from electronic content which overcomes various intentional/unintentional distortions, attacks and combinations thereof.

It is yet another object of the present disclosure to provide a method and system which can perform watermark detection without requiring the original content file or its processed parameters.

Other objects and advantages of the present disclosure will be more apparent from the following description when read in conjunction with the accompanying figures, which are not intended to limit the scope of the present disclosure.

SUMMARY

In accordance with this disclosure, there is envisaged a method for performing at least one of embedding and extraction of an audio watermark, the method comprising the following steps:

segmenting an input audio signal into segments of fixed size;

decomposing each of the segments using multilevel Discrete Wavelet Transform (DWT) to retrieve detailed coefficients;

forming a 'detail coefficient matrix' of the detailed coefficients retrieved for each level of the decomposition;

applying Singular Value Decomposition (SVD) on the 'detail coefficient matrix' to obtain three decomposed matrices including a left singular vector matrix, a right singular vector matrix and a singular value matrix containing four singular values S1, S2, S3 and S4.

Typically, the method of embedding the watermark includes the following steps:

embedding a watermark bit in the segment of the input audio signal by modifying the S2 value of the singular value matrix using a combination of the S1 value, the S4 value and at least two scaling factors having pre-designated values alpha1 and alpha2 based on the formula S2=alpha1*(S1+S4)+alpha2*watermark bit*(S1−S4);

obtaining an modified 'detail coefficient matrix' by performing inverse SVD operation by combining the modified singular value matrix, the unmodified left singular vector matrix and the unmodified right singular vector matrix;

performing multilevel DWT on the modified 'detail coefficient matrix';

iterating aforementioned steps until discrete watermark bits are embedded in each of the segments; and obtaining a watermarked audio signal by combining each of the modified segments.

Preferably, the method of extraction the watermark includes the following steps, wherein the input audio signal is a watermarked audio signal:

determining a threshold value using the S1 value, the S4 value and a scaling factor having pre-designated value alpha1 using the formula (alpha1*(S1+S4));

extracting a watermark bit from each of the segments by comparing the value of S2 with the threshold value using the formula: watermark bit=0, if S2<Threshold Value and watermark bit=1, if S2>=Threshold Value;

performing scrambling and error correction to eliminate errors in extraction of the watermark bit; and combining watermarked bits extracted from each of the segments to form the watermark.

Further, the step of decomposing each of the segments using multilevel Discrete Wavelet includes the step of transforming the segments of the input audio signal in the Discrete Wavelet Transform (DWT) domain using a four-level discrete wavelet decomposition technique selected from the group consisting of Haar, Daubechies, Coiflet, Legendre and symlets.

The present disclosure envisages a computer-implemented system for audio watermarking comprising:

a watermark embedding unit to embed an in-audible watermark in an input audio signal by modifying a predetermined singular value derived by performing Singular Value Decomposition (SVD) operation on the input audio signal in the Discrete Wavelet Transform (DWT) domain; and a watermark extraction unit to perform the SVD operation on a received watermarked audio signal in the DWT domain to derive singular values, the watermark extraction unit comprising an analyzer to identify an embedded watermark by comparing the derived singular values, wherein four singular values S1, S2, S3 and S4 are derived on performing the SVD operation on a received input audio/watermarked audio signal in the DWT domain.

Further, the watermark is represented in the bipolar format and selected from the group consisting of a logo image, a barcode and a random binary sequence.

Still further, the watermark embedding unit and the watermark extraction unit comprise discrete processing means including Media Processors and Digital Signal Processors to perform signal processing and matrix-based operations for watermark embedding and extraction.

Furthermore, the watermark embedding unit and the watermark extraction unit are adapted to perform a four-level discrete wavelet decomposition using a technique selected from the group consisting of Haar, Daubechies, Coiflet, Legendre and symlets.

In addition, the watermark embedding unit and the watermark extraction unit derive the four singular values S1, S2, S3 and S4 by performing at least a four-level DWT operation on predetermined fixed-size segments of the input audio signal and further retrieving three decomposed matrices including a left singular vector matrix, a right singular vector matrix and a singular value matrix containing four singular values S1, S2, S3, wherein the coefficients of a DWT level are arranged to form a 'detail coefficient matrix', wherein each level forms a row in the matrix for a particular segment.

In accordance with this disclosure, the watermark embedding unit modifies the S2 value by replacing the value of the S2 by a value obtained by combining the S1 value, the S2 value, a watermark bit and at least two scaling factors having pre-designated values alpha1 and alpha2 based on the formula S2=alpha1*(S1+S4)+alpha2*watermark bit*(S1−S4).

Typically, the watermark embedding unit obtains a watermarked audio signal by applying inverse SVD and inverse DWT techniques each of the segments of the input audio signal and combining the resultant segments.

Preferably, the watermark extraction unit is adapted to extract the watermark bits of the watermarked audio signal by computing a threshold value based on the formula (alpha1*(S1+S4)) and the analyzer compares S2 value with the threshold value.

In addition, the watermark extraction unit includes error correction means to use scrambling and error correction codes to eliminate errors in watermark extraction to improve accuracy.

BRIEF DESCRIPTION OF THE ACCOMPANYING DRAWINGS

The system and method for blind audio watermarking will now be described with reference to the non-limiting, accompanying drawings, in which.

DETAILED DESCRIPTION OF THE ACCOMPANYING DRAWINGS

The system and method for blind audio watermarking will now be described with reference to the accompanying drawings which do not limit the scope and ambit of the disclosure. The description provided is purely by way of example and illustration.

The present-day watermarking techniques generate watermarked content for distribution; however the content is not robust against attacks and is compromised easily by attackers by tampering the content. Moreover, the existing watermark detection techniques require either the original content or its processed parameters in advance to detect the watermark in the content. These shortcomings of the existing watermarking techniques led the present disclosure to envisage a robust watermarking technique for embedding as well as extraction/detection of watermarks in digital content, specifically audio files.

The proposed system employs at least four-level Discrete Wavelet Transform (DWT) based decomposition and Singular Value Decomposition (SVD) techniques for embedding as well as extracting the watermark. The combination of DWT and SVD provide the proposed system the ability to generate watermarked audio signals which are robust against Gaussian Noise, Brum and add-Sinus, random noise and other watermark based intentional and unintentional attacks. The proposed system is also robust against compression techniques including MPEG 1, MPEG 2 audio layer 3, Advance Audio Codec (AAC), Vorbis for different bit rates. In addition, the system is robust against multiple Pulse Code Modulation (PCM) formats and against different sampling rates and compressions rates.

In accordance with this disclosure, at least one singular value coefficient retrieved from the SVD operation in the wavelet domain is utilized by the present disclosure for hiding the watermark. The watermark can either be in the form of an image/logo image, barcode or a random binary sequence.

Further, the proposed system provides a blind audio watermarking technique in which the watermark extraction is performed based on only the watermarked audio signal received in real-time. The proposed system does not require SVD coefficient values in advance for carrying out the watermark extraction and hence it is a blind watermarking system.

Still further, the proposed system uses scrambling and error correction codes to eliminate errors in watermark extraction to improve accuracy.

Figure 1:
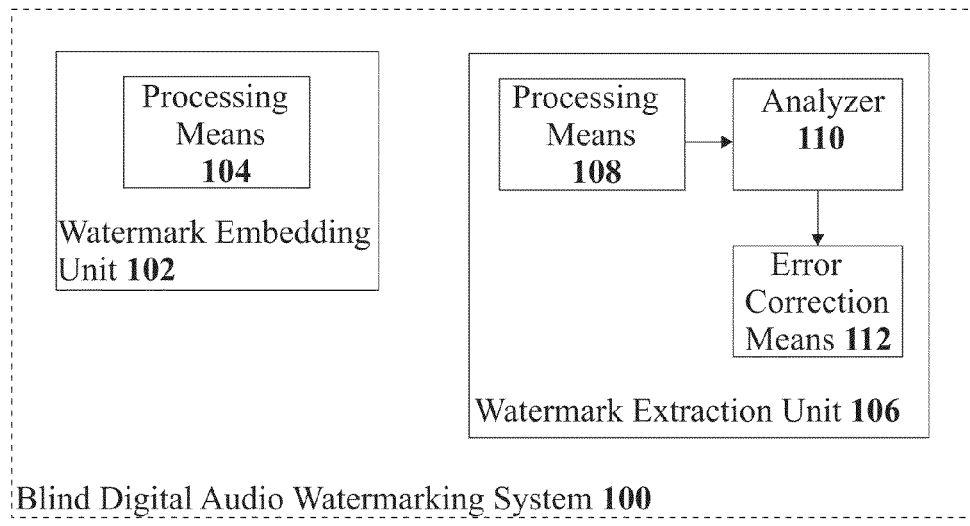
FIG. 1 illustrates a schematic of the system for blind audio watermarking in accordance with this disclosure.

Referring to the accompanying drawings, FIG. 1 shows a block diagram of the blind audio watermarking system 100. The system 100 comprises two main units namely a watermark embedding unit 102 and a watermark extraction unit 106. Both the units 102 and 106 can be deployed in a discrete or combined manner on either a single or distributed content distribution centers/application servers, where watermarked audio files are generated for distribution. As well as the watermarks embedded in watermarked audio files are extracted and checked in real-time for authenticity, preventing piracy and finding the source of content piracy effectively.

In accordance with a first aspect of this disclosure, the watermark embedding unit 102 and the watermark extraction unit 106 comprise discrete processing means 104 and 108 which can either be Media Processors or Digital Signal Processors (DSP) to perform signal processing and matrix-based operations efficiently for watermark embedding unit 102 and extraction unit 106 respectively.

Figure 2:
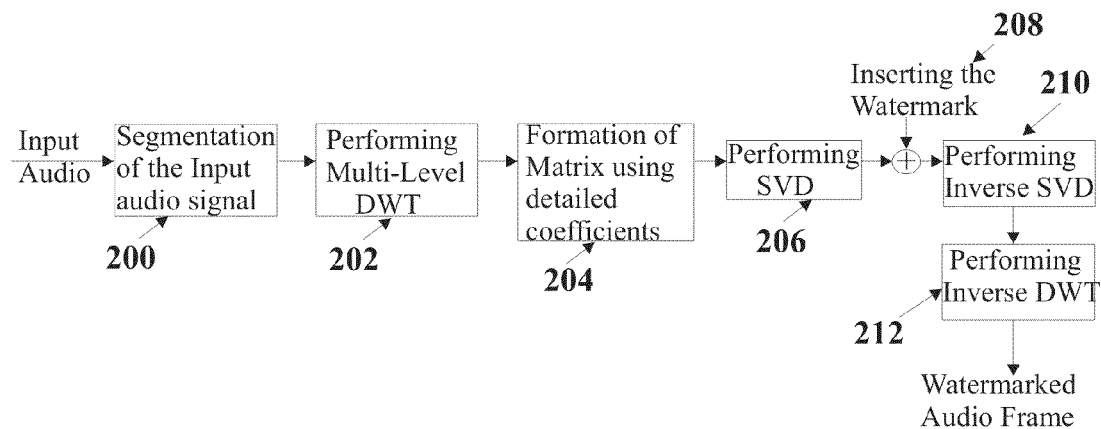
FIG. 2 is a process flow diagram showing the steps for embedding a watermark in an audio signal in accordance with this disclosure.

In accordance with the first aspect of this disclosure, the watermark embedding unit 102 embeds an in-audible watermark in an input audio file/signal. The watermark embedding unit 102 performs the steps as seen in FIG. 2 using a processing means 104. Referring to FIGS. 1 & 2, watermark embedding unit 102 is provided with an input audio file, which is typically in the way file format, in which the watermark is to be embedded. This input audio is segmented into multiple segments of fixed size, 200. Each segment is having a fixed number of samples and each watermark bit is embedded into one segment of audio. The number of samples per segment used in this disclosure is typically, 12000 samples.

In accordance with this disclosure, the more the number of segments the more the number of watermark bits that can be accommodated into a given audio of fixed size.

The watermark embedding unit 102 subsequently applies multilevel Discrete Wavelet Transform (DWT) 202 on each segment of the input audio signal; typically a four-level DWT is applied by the watermark embedding unit 102. This disclosure uses any one of Haar, Daubechies, Coiflet, legendre and symlets techniques to find discrete wavelet transform of the input audio signal. In accordance with this disclosure, each audio segment is input to the processing means 104 for performing a first level DWT. The first level DWT divides the input audio frame into approximate and detailed coefficients, the approximate coefficients resulting from the first level decomposition form the input to the next level DWT decomposition and this process is repeated till four levels of DWT are completed.

Figure 3:
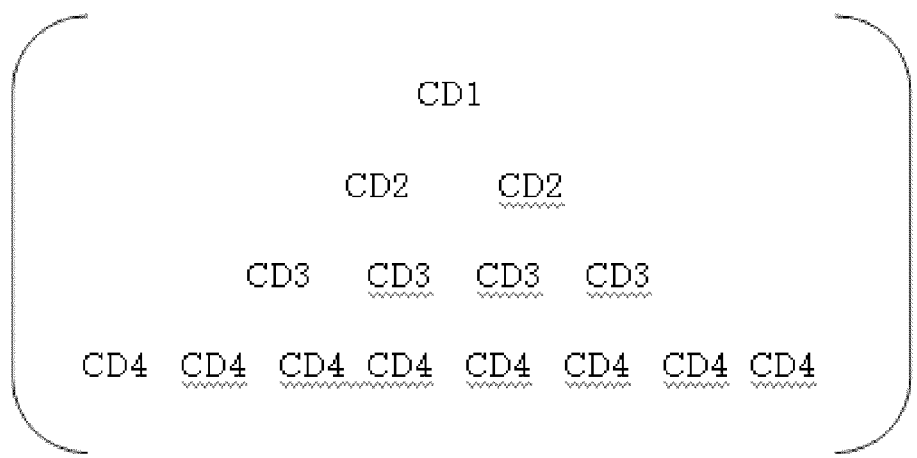
FIG. 3 is an exemplary diagram showing the matrix formed using detailed coefficients obtained on performing multilevel DWT in accordance with this disclosure.

Subsequent to receiving the detailed coefficients from each DWT level, processing means 104 of the watermark embedding unit 102 arranges the detailed coefficients into a 'detail coefficient matrix' 204. The 'detail coefficient matrix' is shown in FIG. 3, wherein CD1 is the row formed from detailed coefficients of DWT level-1 and CD2, CD3, and CD4 are obtained from DWT level-2, level-3, and level-4 respectively. In accordance with this disclosure, the size of CD1 is half the size of the number of samples in the input audio segment. Similarly, the size of CD2 is half of the size of samples in CD1, the size of CD3 is half the size of samples in CD2 and size of CD4 is half the size of samples in CD3. The size of the 'detail coefficient matrix' thus formed is the number of DWT levels by half the number of samples in an audio frame, which typically, comes to 4×6000.

Post formation of the 'detail coefficient matrix', the watermark embedding unit 102 applies Singular Value Decomposition (SVD) on this matrix of detailed coefficients 206. The SVD operation factors the input 'detail coefficient matrix' into three matrices namely a left singular vector matrix, a right singular vector matrix and a singular value matrix. Out of these three, the singular value matrix is a square matrix/diagonal matrix 'D' having singular values as its diagonal elements and its size is equal to the number of DWT levels, typically, the size is 4×4. The singular values are generally represented by reference numerals S1, S2, S3, and S4.

These singular values are used to embed the watermark bit. The watermark is made from either unique random binary bits which are assigned to a customer, customer dependent barcode or from customer dependent logo. In accordance with this disclosure, the watermark is converted into single dimensional vector, if the watermark is in a two dimensional matrix form for instance in the form of a logo or a barcode, then the resultant one dimensional vector is converted into a bipolar form, that is 1's and −1's. The 1's of the bipolar form represent 1's of the watermark and −1's of the bipolar form represent 0's of the watermark. The watermark embedding unit 102 inserts a watermark bit in a segment by modifying the value of S2 in the singular value matrix using a combination of the value of S1, the value of S4 and at least two scaling factors having pre-designated values alpha1 and alpha2 based on the formula S2=alpha1*(S1+S4)+alpha2*watermark bit*(S1−S4), represented by step 208 of FIG. 2. The scaling factors alpha1 and alpha2 both are typically assigned a pre-designated value of 0.5.

Subsequent to the value of S2 being updated, watermark embedding unit 102 obtains an modified 'detail coefficient matrix' by performing inverse SVD operation by combining the modified singular value matrix, the unmodified left singular vector matrix, the unmodified right singular vector matrix to get 'modified detail coefficient matrix' 210, similar to the 'detail coefficient matrix' seen in FIG. 3.

Modified detailed coefficient values, generally represented by reference numerals mCD1, mCD2, mCD3, and mCD4 are extracted from the 'modified detail coefficient matrix', where mCD1, mCD2, mCD3, and mCD4 are modified equivalents of detailed coefficients CD1, CD2, CD3, and CD4 respectively. The watermark embedding unit 102 performs multi level inverse DWT using these modified detailed coefficients and approximated coefficients of DWT 212. The watermark embedding unit 102 performs the multi level inverse DWT for as many levels as performed in step 202, in accordance with this disclosure, which are typically four. The resulting signal obtained after performing the inverse DWT operation is the watermarked audio frame. The above steps 202 to 212 are repeated for each segment of the input audio until all the watermark bits in the watermark signal are embedded into each of the segments. Finally, the watermark embedding unit 102 combines all the frames in sequence to produce a watermarked audio signal.

Using the aforementioned operations, the processing means 104 of the watermark embedding unit 102 generates robust watermarked audio signals by utilizing the Singular values obtained by performing SVD in the wavelet domain to hide the watermark bit and then applying inverse SVD and inverse DWT operations to retrieve the watermarked audio. Thus, in this way the processing means 104 makes the embedded watermark robust and prevents the watermarked audio signals from various attacks, compression and sampling based distortions.

Figure 4:
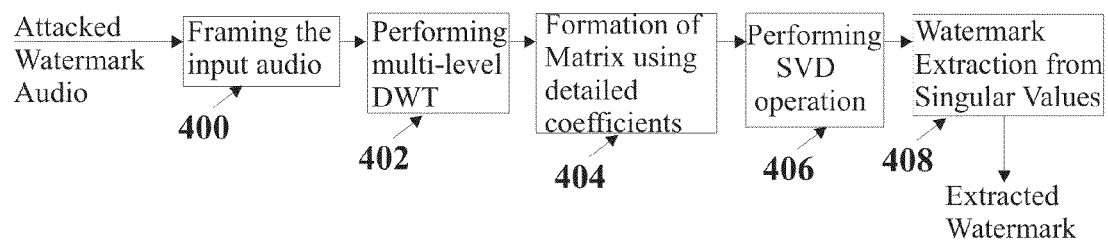
FIG. 4 is a process flow diagram showing the steps for extracting/detecting a watermark from an attacked watermarked audio signal in accordance with this disclosure.

Referring to FIG. 1 and FIG. 4, the watermark extraction unit 106 performs the watermark extraction/detection process in real-time. FIG. 3 depicts the watermark extraction process in accordance with this disclosure.

The watermark extraction unit 106 employs the processing means 108, which receives an attacked or a modified watermarked audio. The processing means 108 performs the steps 400 to 406 in the same manner as steps 200 to 206 of FIG. 2 for the attacked/watermarked audio signal. On performing steps 400 to 406, the processing means 108 obtains singular values, which are represented as WS1, WS2, WS3, and WS4 from which watermark bit is to be extracted. In accordance with this disclosure, the watermark extraction unit 106 does not require the stored original audio or singular value of the original audio signal to retrieve the watermark bit from each of the segments, hence it is a blind watermarking system.

The processing means 108 uses WS1, WS2, and WS4 to retrieve a watermark bit from each of the segments using a thresholding technique, wherein a threshold value is determined using the S1 value, the S4 value and a scaling factor having pre-designated value alpha1, using the formula Threshold value=(alpha1*(S1+S4)). The threshold value and value of S2 is passed to an analyzer 110 which identifies an embedded watermark bit in each of the segments by comparing the Singular value S2 with the threshold value, represented by step 408 of FIG. 4, using the following formula as given below:

Watermark bit=0, if S2<threshold value

Watermark bit=1, if S2>=threshold value where alpha1 is similar to alpha1 used in the watermark embedding unit 102 and is pre-designated a value of typically, 0.5 in accordance with this disclosure. The steps 400 to 408 are performed on every segment of the input attacked/watermarked audio for extracting the watermark bits. The watermark extraction unit 106 further includes error correction means 112 which uses scrambling and error correction codes to eliminate errors in the extraction process to improve extraction accuracy.

The processing means 108 combines all the extracted bits from each of the segments to form the watermark which is used to find the source of content piracy.

Test Results

Figure 5A:
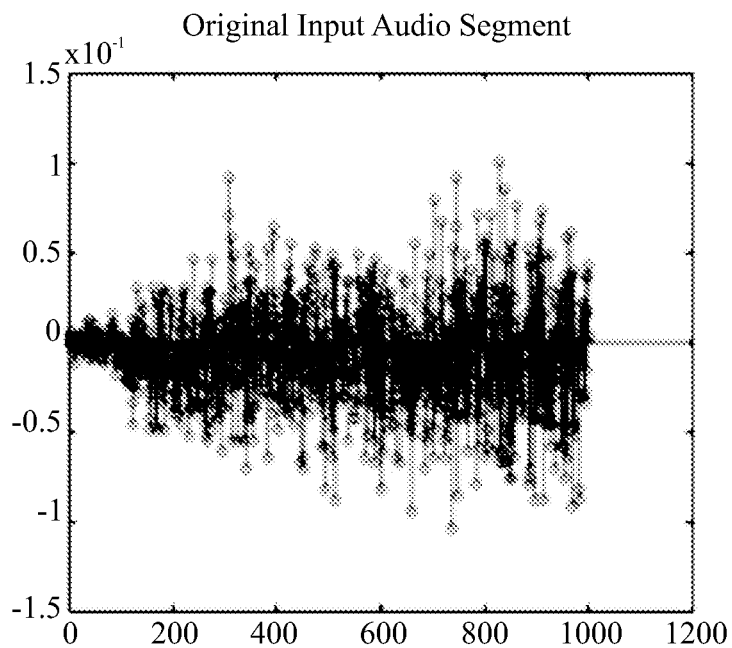
FIG. 5a shows an exemplary graphical representation of an input audio signal before watermarking.
Figure 5B:
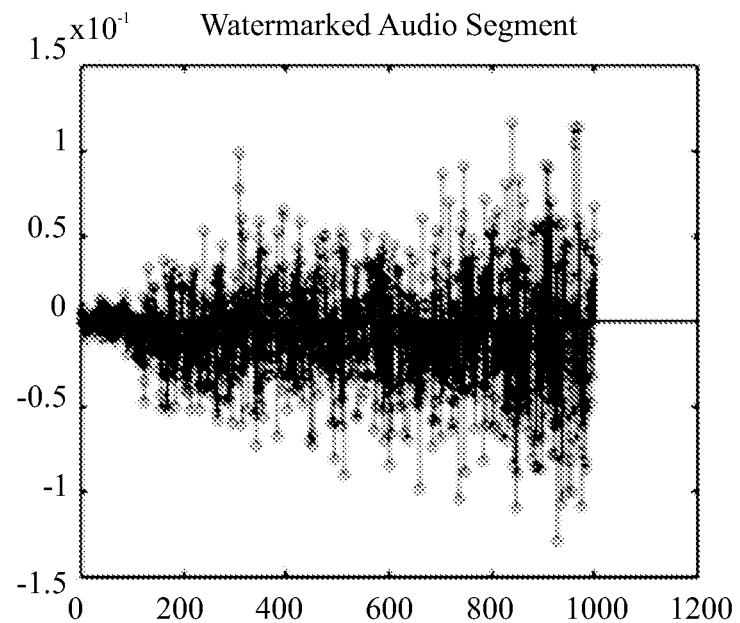
FIG. 5b shows an exemplary graphical representation of an input audio signal after watermarking.

The system proposed by this disclosure was tested using an input watermark logo of size 20×30. This watermark was translated into one dimensional vector of size 1×600 and then converted into the bipolar form. The proposed system received the input audio signal in the form of a PCM sample containing both music and voice with a sampling rate of 44100. The disclosure considered 12000 samples per window, when segmenting the input audio signal. Thus, the input audio signal contained at least 600 frames to accommodate at least 600 watermark bits. The audio was then watermarked using the steps 200 to 212 of FIG. 2. FIG. 5a and FIG. 5b show an exemplary graph of the input audio signal used for watermarking and the resultant watermarked audio for a few samples. The watermark embedding as well as extraction was performed using the PCM samples.

Typically, attacks which mostly likely occur in an audio signal are performed by changing the bit rate, changing the compression type and changing the sampling rate attacks. The watermark embedded by the proposed system was tested for most of the attacks by changing different compression type with different bit rates and the test results show that the proposed method and system is robust against the tested attacks. The embedded watermark was also tested by adding random noise, add brum attack and add sinus attack and it was seen that the embedded watermark was robust against these attacks. Further, the embedded watermark was also tested under changing sampling rate attacks and the embedded watermark proved robust against these attacks as well.

The following TABLES 1 to 3 give the number of errors that occurred in terms of bit change out of 600 bits for different attacks.

| Attacked codec type | Attacked bitrate (kbps) | Errors (out of 600 bits) |
| --- | --- | --- |
| Mp3 | 324 | 4 |
| Mp3 | 224 | 4 |
| Mp3 | 164 | 4 |
| Mp3 | 64 | 8 |
| Ogg | 64 | 0 |
| Aac | 64 | 2 |

TABLE 1 shows the Errors that occurred for changing the bit rates when attacking a watermarked audio signal.

| Attacked codec type | Attacked sampling rate | Attacked bitrate (kbps) | Errors (out of 600 bits) |
|---|---|---|---|
| Mp3 | 44100 | 64 | 8 |
| Mp3 | 48000 | 64 | 10 |
| Ogg | 44100 | 64 | 0 |
| ogg | 48000 | 64 | 2 |
| aac | 44100 | 64 | 2 |
| Aac | 96000 | 64 | 110 |

TABLE 2 shows the Errors that occurred for changing the sampling rates when attacking a watermarked audio signal.

| Variance (Gaussian noise) | SNR (db) | Errors (out of 600 bits) |
|---|---|---|
| 1 | 10 | 9 |
| 1 | 30 | 2 |
| 1 | 50 | 3 |

TABLE 3 shows the Errors that occurred for changing the compression rates when attacking a watermarked audio signal.

TECHNICAL ADVANTAGES

The technical advantages of the present disclosure include realization of a computer-implemented method and system for audio watermarking and detection.

The proposed system embeds the watermark by hiding in-audible watermark bits in predetermined singular value decomposition coefficients in the wavelet domain. This technique makes the generated watermarked audio signal robust against Gaussian noise, random noise, Brum and add-Sinus as well as other watermark removal attacks. The proposed system is also robust against compression attacks for different bit rates and sampling rates. The embedded watermark is robust against compression techniques including MPEG1, MPEG2, audio layer 3, AAC (Advance audio codec) and Vorbis compression for different bit rates. The system is also robust against multiple PCM formats.

Further, the proposed system performs a blind audio watermark detection technique which does not require the original audio or its processed parameters like SVD coefficients to extract/detect the embedded watermark. The blind audio watermarking techniques safeguard the watermarked audio signal from any tampering as the system does not require any processed parameters in advance for watermark detection.

Still further, the proposed system utilizes scrambling and error correction codes to eliminate errors in extraction process to improve accuracy.

The proposed watermark system and method finds a number of applications in Information Security and Digital watermarking. Applications where the proposed system is used include:
a) Digital copyrights management; and
b) Multimedia security.

However, the scope of the proposed system is not restricted to the above applications.

Thus, the present disclosure provides a robust blind audio watermarking system and method which embeds and extracts watermarks in real-time with high efficiency.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

Wherever a range of values is specified, a value up to 10% below and above the lowest and highest numerical value respectively, of the specified range, is included in the scope of the disclosure.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the particular features of this invention, it will be appreciated that various modifications can be made, and that many changes can be made in the preferred embodiment without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A computer-implemented method for performing at least one of embedding and extraction of audio watermark, the method comprising the following steps:
    segmenting an input audio signal into segments of fixed size;
    applying multilevel Discrete Wavelet Transform (DWT) on each segment of the input audio signal;
    decomposing each of said segments using multilevel Discrete Wavelet Transform (DWT) to retrieve detailed coefficients;
    forming a detail coefficient matrix of said detailed coefficients retrieved for each level of said decomposition; and
    applying Singular Value Decomposition (SVD) on said detail coefficient matrix to obtain three decomposed matrices including a left singular vector matrix, a right singular vector matrix and a singular value matrix containing four singular values S1, S2, S3 and S4, and
    wherein the extraction of the audio watermark includes the following steps:
        determining a threshold value using said singular value S1, said singular value S4 value and a scaling factor having pre-designated value alpha1 using the formula Threshold value=(alpha1*(S1+S4));
        extracting a watermark bit from each of said segments by comparing the singular value S2 with said threshold value using the formula:
            watermark bit=0, if S2<Threshold Value and
            watermark bit=1, if S2>=Threshold Value;
        scrambling and error correction to eliminate errors in extraction of said watermark bit; and
        combining watermarked bits extracted from each of said segments to form the watermark.

2. The method as claimed in claim 1, wherein the method of embedding the watermark includes the following steps:
    embedding a watermark bit in a segment of said input audio signal by modifying said singular value S2 of said singular value matrix using a combination of said singular value S1, said singular value S4 and at least two scaling factors having pre-designated value alpha1 and alpha2 based on a formula S2=alpha1*(S1+S4)+alpha2*watermark bit*(S1−S4);
    obtaining a modified detail coefficient matrix by performing inverse SVD operation by combining the singular value matrix having the modified singular value with said left singular vector matrix, and said right singular vector matrix,
        wherein a modified detailed coefficient values are extracted from the modified detailed coefficient matrix;
    performing multilevel Inverse Discrete Wavelet Transform (IDWT) on said modified detail coefficient matrix;
    iterating the steps of embedding a watermark bit, obtaining a modified detail coefficient matrix, and performing multilevel Inverse Discrete Wavelet Transform (DWT) until discrete watermark bits are embedded in each of said segments; and
    obtaining a watermarked audio signal by combining each of the segments modified by the discrete watermark bits.

3. The method as claimed in claim 1, wherein the step of decomposing each of said segments using multilevel Discrete Wavelet Transform includes the step of transforming said segments of said input audio signal in the Discrete Wavelet Transform (DWT) domain.

4. A computer-implemented system for audio watermarking comprising:
    a watermark embedding unit to embed an in-audible watermark in an input audio signal by modifying a predetermined singular value derived by performing Singular Value Decomposition (SVD) operation on said input audio signal in the Discrete Wavelet Transform (DWT) domain; and
    a watermark extraction unit to perform said SVD operation on a received watermarked audio signal in the DWT domain to derive singular values, said watermark extraction unit comprising an analyzer to identify an embedded watermark by comparing the derived singular values,
        wherein four singular values S1, S2, S3 and S4 are derived on performing said SVD operation on a received input watermarked audio signal in the DWT domain,
        wherein said watermark extraction unit is adapted to extract watermark bits in segments of said watermarked audio signal by computing a threshold value based on a formula (alpha1*(S1+S4)) and said analyzer compares S2 value with said threshold value, and
        wherein said watermark extraction unit includes error correction means to use scrambling and error correction codes to eliminate errors in watermark extraction to improve accuracy.

5. The system as claimed in claim 4, wherein said embedded watermark is represented in a bipolar format and selected from a group consisting of a logo image, a barcode and a random binary sequence.

6. The system as claimed in claim 4, wherein said watermark embedding unit and said watermark extraction unit comprise discrete processing means including Media Processors and Digital Signal Processors to perform signal processing and matrix-based operations for watermark embedding and extraction.

7. The system as claimed in claim 4, wherein said watermark embedding unit and said watermark extraction unit is adapted to perform a four-level discrete wavelet decomposition to transform said segments of said audio signal in the DWT domain.

8. The system as claimed in claim 4, wherein said watermark embedding unit and said watermark extraction unit derive said four singular values S1, S2, S3 and S4 by performing at least a four-level DWT operation on predetermined fixed-size segments of said input audio signal and further retrieving three decomposed matrices including a left singular vector matrix, a right singular vector matrix and a singular value matrix containing four singular values S1, S2, S3 and S4, wherein said Discrete Wavelet Transform (DWT) coefficients of a DWT level are arranged to form a detail coefficient matrix, wherein the DWT level forms a row in the detail coefficient matrix for a particular segment.

9. The system as claimed in claim 4, wherein said watermark embedding unit modifies said S2 value by replacing the value of said S2 by a value obtained by combining said S1 value, said S2 value, a watermark bit and at least two scaling factors having pre-designated values alpha1 and alpha2 based on the formula S2=alpha1*(S1+S4)+alpha2*watermark bit*(S1−S4).

10. The system as claimed in claim 4, wherein said watermark embedding unit obtains a watermarked audio signal by applying inverse SVD and inverse DWT techniques on segments of said input audio signal and combining the resultant segments.

* * * * *